United States Patent [19]

Nishino et al.

[11] Patent Number: 4,630,846
[45] Date of Patent: Dec. 23, 1986

[54] PIPE JOINT

[75] Inventors: Yoshinori Nishino, Yamato-takada; Masahiko Yamamoto, Nishinomiya; Tadayoshi Uda, Izumi; Tomoyoshi Kanazawa, Kobe, all of Japan

[73] Assignee: Hitachi Zosen Corporation, Osaka, Japan

[21] Appl. No.: 482,840

[22] Filed: Apr. 7, 1983

[51] Int. Cl.⁴ ............................................. F16L 47/02
[52] U.S. Cl. ..................................... 285/21; 285/173; 285/293; 285/328; 285/371; 285/423; 285/906; 285/368; 156/304.2; 156/158; 156/344
[58] Field of Search ............... 285/328, 290, 291, 289, 285/293, 295, 292, 332, 371, DIG. 7, 423, 368, 21, 173, 906; 156/304.2, 304.3, 304.5, 158, 159, 195, 172, 289, 344

[56] References Cited

U.S. PATENT DOCUMENTS

| 2,930,634 | 3/1960 | Merritt | 285/423 X |
| 3,540,757 | 11/1970 | Neher | 285/289 X |
| 3,989,280 | 11/1976 | Schwarz | 285/21 |
| 4,147,381 | 4/1979 | Schwarz | 285/371 X |
| 4,257,630 | 3/1981 | Bartell et al. | 285/423 |

FOREIGN PATENT DOCUMENTS

| 2320177 | 10/1973 | Fed. Rep. of Germany | 285/423 |
| 7709185 | 3/1979 | Sweden | 285/423 |
| 1520729 | 8/1978 | United Kingdom | 285/21 |

Primary Examiner—Dave W. Arola
Attorney, Agent, or Firm—Joseph W. Farley

[57] ABSTRACT

A pipe joint wherein an annular connecting resin body in contact and engagement with the outer periphery of one end of at least one pipe is used for connecting the end of the pipe to one end of another pipe. The joint comprises a device for reinforcing the bond between said one pipe and the connecting resin body in addition to sanding provided for the outer periphery of the end of said one pipe. The bond reinforcing device is a barbed wire, barbed tape, piano wire or the combination of engaging grooves and engaging projections, which prevents the axial displacement of said one pipe relative to the resin body to avoid cracking due to such displacement.

13 Claims, 17 Drawing Figures

PIPE JOINT

The present invention relates to pipe joints, and more particularly to a pipe joint wherein an annular connecting resin body adapted for contact and engagement with the outer periphery of one end of at least one pipe is used for connecting the end of the pipe to another pipe.

Annular connecting resin bodies are widely used for interconnecting two fiber reinforced resin pipes and also for connecting a pipe of a fiber reinforced resin to a pipe made of a material different from the resin (hereinafter referred to as a "stranger pipe"), such as an iron pipe, vinyl chloride pipe, Hume concrete pipe or stainless steel pipe.

Two pipes are connected together, for example, by arranging the pipes end-to-end with a small clearance formed therebetween, roughing the outer periphery of each of the opposed pipe ends by sanding, applying an overlay of resin to the outer peripheries of the pipe ends and pouring the same resin into the clearance between the pipe ends to form an annular connecting resin body. Accordingly the two pipes are connected together indirectly by the resin body bonded to the pipes. With conventional pipe joints of this type, however, the opposed ends of the pipes are merely rough-surfaced by sanding, so that the bond strength between the resin body and the two pipes, which is not as high as is desired, involves the problem that when subjected to a great tensile force, the pipes are displaced relative to the resin body by being forced outward axially thereof. Such axial displacement of the two pipes results in a tensile crack in the midportion of the resin body positioned in the clearance between the opposed pipe ends. The crack thus formed will develop over the entire length of the resin body or is likely to develop into the pipes per se, consequently breaking the pipe joint or permitting a leak of the internal fluid through the crack.

An object of the present invention is to provide a pipe joint of the type wherein a connecting resin body is used for connecting two pipes together and which is adapted to prevent the pipes from being forced outward and displaced from the resin body to preclude the break of the joint or leakage of the internal fluid that could otherwise result from such displacement.

To fulfill this object, the invention provides a pipe joint wherein an annular connecting resin body adapted for contact and engagement with the outer periphery of one end of at least one pipe is used for connecting the end of the pipe to an end of another pipe, the pipe joint comprising means for reinforcing the bond between said one pipe and the connecting resin body in addition to sanding provided for the outer periphery of the end of said one pipe.

Various features and advantages of the invention will be readily understood from the embodiments to be described below with reference to the accompanying drawings, in which.

Throughout the drawings, like parts are referred to by like reference numerals.

Before the description of embodiments of the invention, some terms will be explained.

Reinforcing fiber fabric (or merely fabric): a reinforcement woven of rovings of glass fibers for example for giving increased mechanical strength to a resin body when embedded in the resin body.

Reinforcing fiber mat (or simply mat): a reinforcement in the form of a sheet prepared from filaments of e.g. glass fibers with use of a binder for giving increased mechanical strength to a resin body when embedded therein.

Reinforcing fiber sheet (or simply sheet): a term meaning a reinforcing fiber fabric or a reinforcing fiber mat but used without specifically referring to one of these materials.

Figure 1:
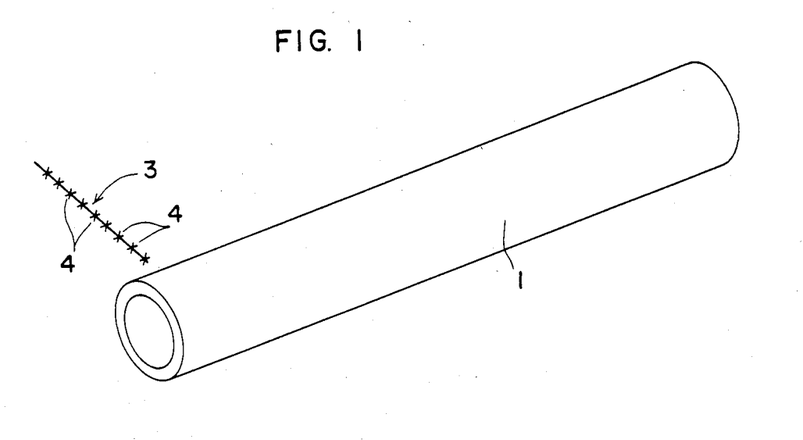
FIG. 1 is a perspective view showing a barbed wire serving as bond reinforcing means immediately before it is wound around a pipe to be joined to a pipe joint according to a first embodiment of the invention.
Figure 2:
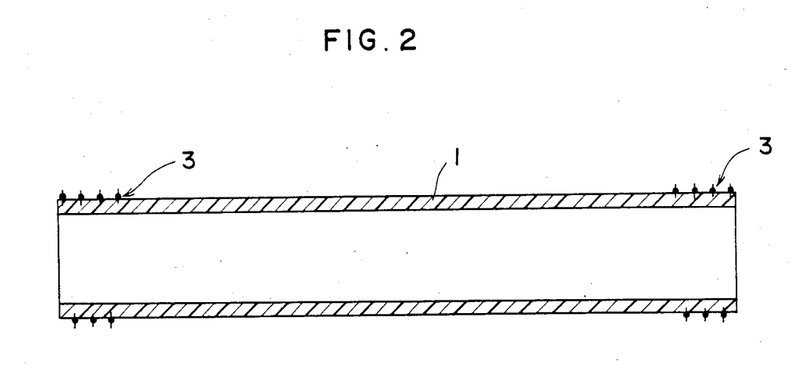
FIG. 2 is a view in longitudinal section showing the pipe having the barbed wire wound around the outer periphery of each end thereof.
Figure 3:
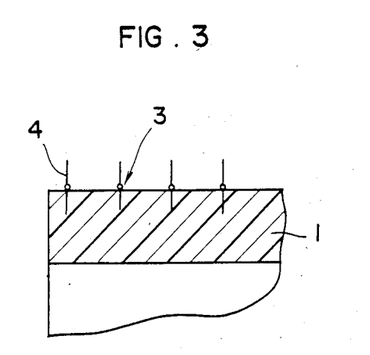
FIG. 3 is a fragmentary enlarged view in section showing the pipe.
Figure 4:
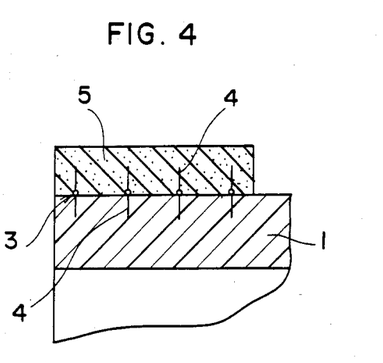
FIG. 4 is a fragmentary enlarged view in section showing the pipe during transport.

A pipe joint of first embodiment of the invention will be described with reference to FIGS. 1 to 5 showing the steps of producing the joint. First, an uncured resin pipe 1 and a barbed wire 3 are prepared as seen in FIG. 1. The resin pipe 1 is reinforced, usually with reinforcing fiber sheets incorporated therein. A length of barbed wire 3 is wound around the outer periphery of each end of the resin pipe 1, some of the barbs 4 thereof are driven into the end of the resin pipe 1, and the resin pipe 1 is thereafter cured (FIGS. 1 and 2). At this time, the other barbs 4 of the wire 3 remain exposed. The resin pipe 1 in this state is transported to the site of installation, but the exposed barbs 4 of the wire 3 are very hazardous. Accordingly the resin pipe 1 is transported with the barbed wire 4 covered with a protector 5 of urethane or the like from above as shown in FIG. 4. The protector 5 is removed at the site. Next, the resin pipe 1 and another resin pipe 2 similarly prepared are arranged end-to-end, and an annular connecting resin body 6 is formed over the outer peripheries of the opposed ends of the two pipes 1 and 2 by the hand lay-up method. When thus forming the resin body 6 by lamination, suitable reinforcing fiber sheets 7 are incorporated into the lay-up to give increased mechanical strength to the resin body 6 to be formed.

Figure 5:
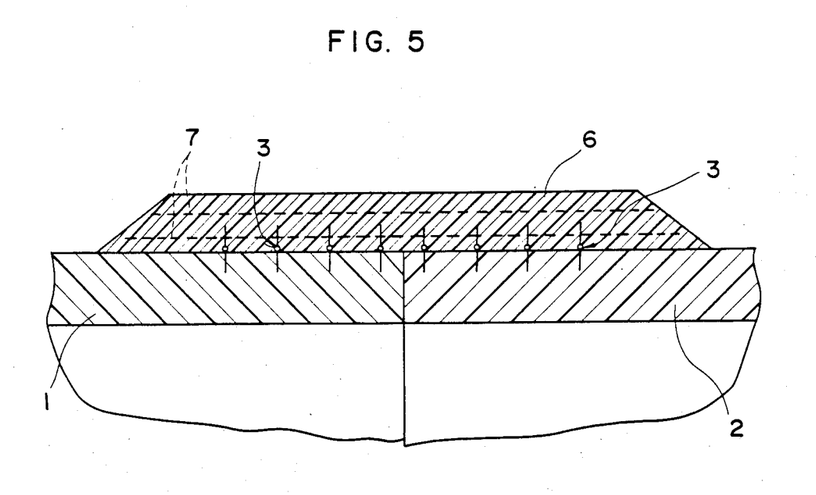
FIG. 5 is a fragmentary sectional view showing the pipe joint of the first embodiment.
Figure 6:
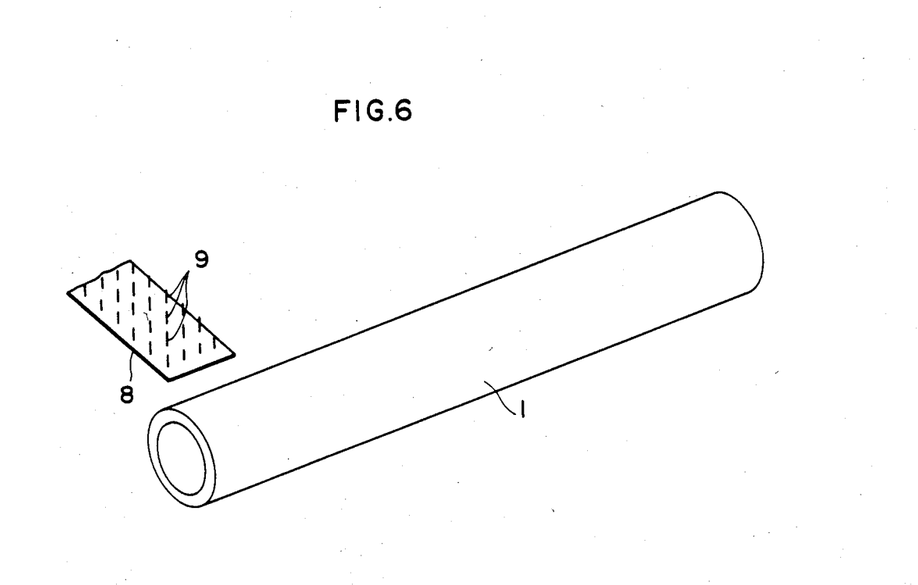
FIG. 6 is a perspective view showing a barbed tape serving as bond reinforcing means immediately before it is wound around a pipe to be joined to a pipe joint according to a second embodiment of the invention.
Figure 7:
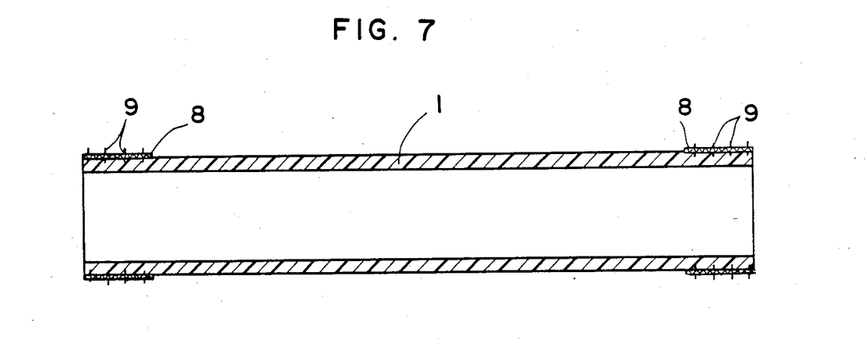
FIG. 7 is a view in longitudinal section showing the pipe having the barbed tape wound around each end thereof.
Figure 8:
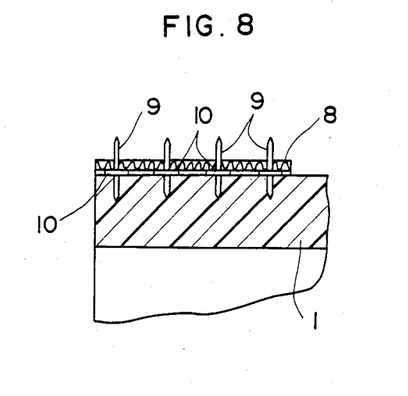
FIG. 8 is a fragmentary enlarged view in section showing the pipe.
Figure 9:
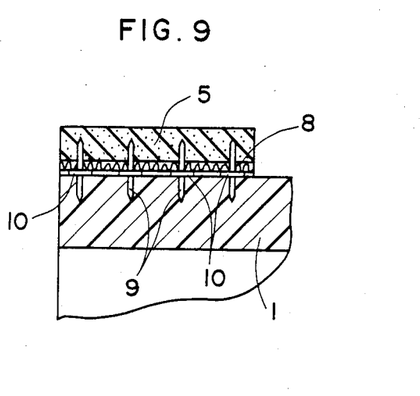
FIG. 9 is a fragmentary enlarged view in section showing the pipe during transport.
Figure 10:
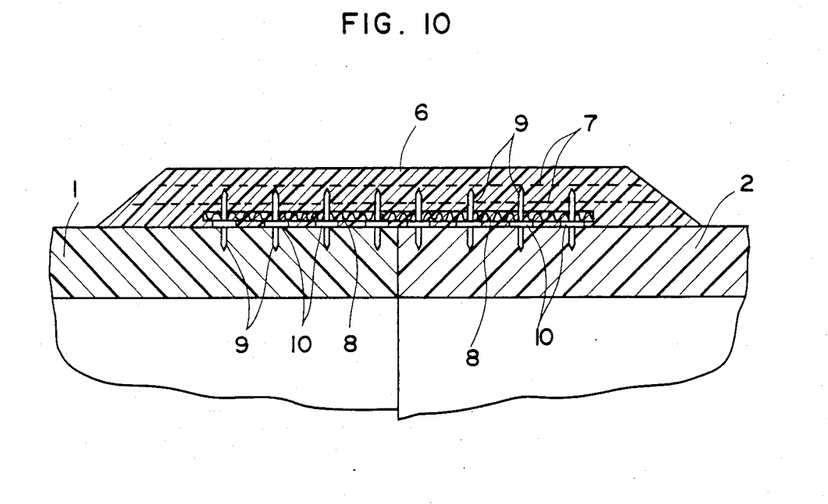
FIG. 10 is a fragmentary sectional view showing the pipe joint of the second embodiment.

With the pipe joint thus constructed, the barbed wire 3 functions as means for reinforcing the bond between the connecting resin body 6 and each of the resin pipes 1 and 2 to preclude the break in the pipe joint or leakage that could result from cracking.

FIGS. 6 to 10 show another pipe joint which has exactly the same construction as the pipe joint shown in FIGS. 1 to 5 except that the barbed wire is replaced by a barbed tape 8 serving as bond reinforcing means. The tape 8 comprises a reinforcing fiber sheet and a multiplicity of barbs 9 each having a retaining flange 10 and extending through the sheet from inside. Like the barbed wire, the barbed tape 8 prevents the break of the pipe joint or leakage due to cracking.

The uncured resin pipes used for the first and second embodiments can be replaced by cured resin pipes of thermoplastic resin. In this case, the barbed wire or barbed tape is wound around the thermoplastic resin pipe after the pipe has been heated to about 300° to about 500° C.

Figure 11:
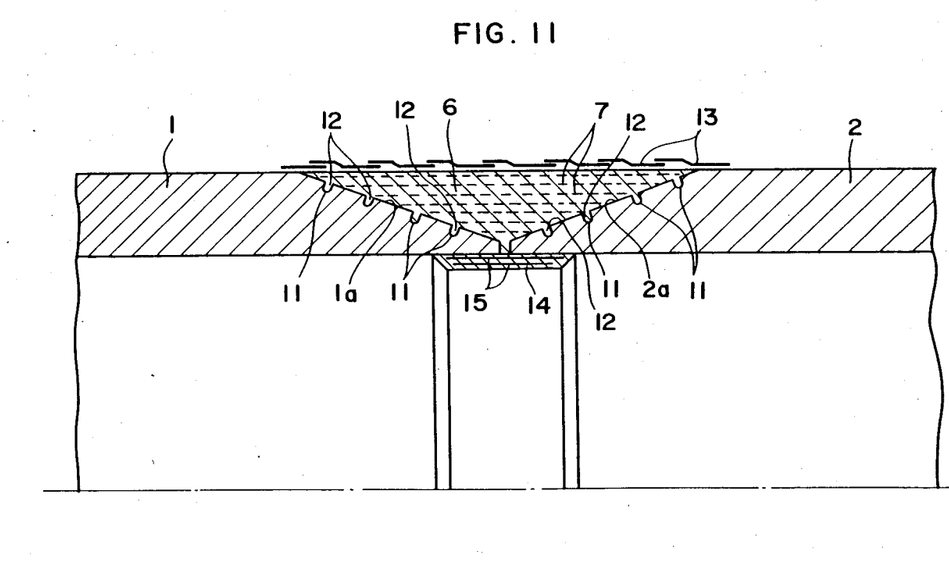
FIG. 11 is a fragmentary sectional view showing a pipe joint of third embodiment of the invention.

The pipe joint shown in FIG. 11 is a so-called scarf joint. Two resin pipes 1 and 2 are arranged as opposed to each other end-to-end. The opposed ends have outer peripheries 1a and 2a which are tapered toward each other to thereby form an annular recess which is approximately V-shaped in section. Each of the tapered outer peripheries 1a and 2a is formed with annular engaging grooves 11 arranged at a suitable spacing axially of the pipe. An annular connecting resin body 6 having reinforcing fiber sheets 7 incorporated therein is fitted in the annular recess defined by the tapered outer peripheries 1a and 2a of the resin pipes 1 and 2. Annular engaging projections 12 fittingly engaged in the grooves 11 in the outer peripheries 1a, 2a of the resin pipes 1, 2 are formed on the inner periphery of the resin body 6. The outer periphery of the resin body 6 is made smooth and flush with the normal-diameter outer peripheries of the resin pipes 1, 2 by winding a releasable tape 13 as of Teflon therearound while the resin body 6 is still uncured, such that an excess of resin flows out through the clearance between the side edges of the tape 13. After the resin body 6 has been cured, the tape 13 may be removed or left unremoved. A resin seal 14 having reinforcing fiber sheets 15 is applied to the inner peripheries of the opposed ends of the resin pipes 1, 2.

With the scarf joint thus constructed, the engaging grooves 11 of the resin pipes 1, 2 and the engaging projections 12 on the connecting resin body 6 function as means for reinforcing the bond therebetween, preventing the joint from breaking or permitting a leak due to cracking. Further because the reinforcing fibers of the sheets 7 engage, for example at the side edges of the sheets 7, in the engaging grooves 11 of the resin pipes 1, 2, the strength of the fibers also acts to reinforce the bond between the resin body 6 and the resin pipes 1, 2. It is known that if the outer periphery of the resin body 6 is not smooth-surfaced or has irregularities, stress concentration occurs locally at the junction between the resin body 6 and the resin pipes 1, 2 when the joint is subjected to a tensile force, render-the joint susceptible to a break, whereas the present embodiment is free of such a problem since the outer periphery of the resin body 6 is made smooth-surfaced by the releasable tape 12. The resin seal 14 acts to prevent leaks even if a crack develops in the connecting resin body 6 and also assists the resin body 6 in connecting the two resin pipes 1, 2 together.

Figure 12:
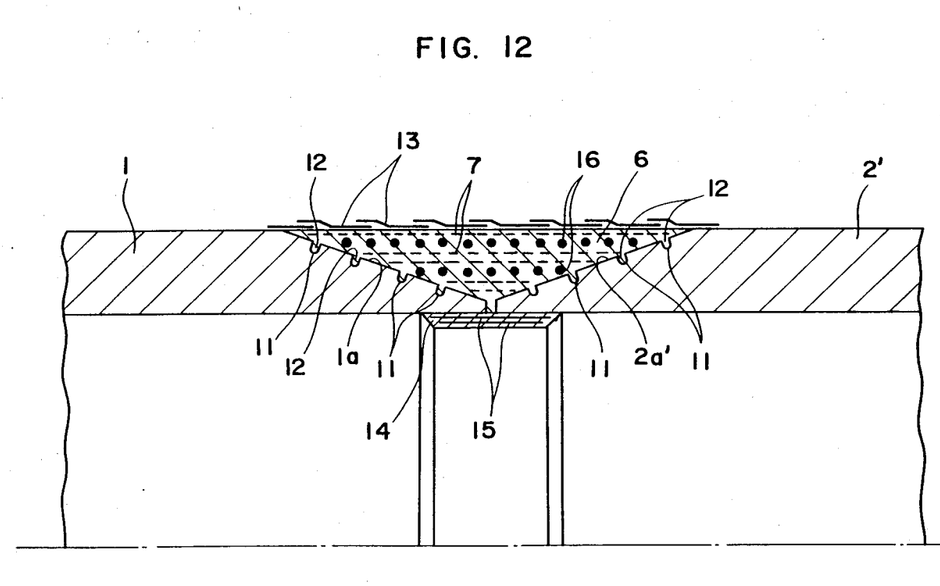
FIG. 12 is a fragmentary sectional view showing a pipe joint of fourth embodiment of the invention.

FIG. 12 shows another scarf joint which is similar to the one shown in FIG. 11. However, a stranger pipe 2' is used as one of the two pipes. A connecting resin body 6 has embedded therein in two layers piano wires 16 which are tightened up to press the resin body 6 against tapered outer peripheries 1a, 2a' of the resin pipe 1 and the stranger pipe 2'. Each piano wire 16 is embedded in the resin body 6 when the body 6 is prepared from resin and reinforcing fiber sheets 7 by the hand lay-up method.

When the pipe joint connecting a resin pipe to a stranger pipe is subjected to an internal fluid pressure, the two pipes undergo different amounts of deformation due to the difference in Young's modulus between the two pipes, resulting in the likelihood that the joint will break. With the pipe joint according to the present embodiment, however, the resin pipe 1 and the stranger pipe 2' are prestressed by tightening up the piano wires 16, so that even if the two pipes 1, 2' are subjected to a high internal pressure, no difference occurs in the amount of deformation between the pipes at the position of the joint, thus eliminating the likelihood of the joint breaking. Further because the piano wires 16 hold the resin body 6 in pressing contact with the two pipes 1, 2', the wire also has the function of bond reinforcing means like the engaging grooves 11 and the engaging projections 12.

Although the engaging grooves 11 of the embodiments shown in FIGS. 11 and 12 are approximately U-shaped in cross section, they may be V-shaped or rectangular. Each annular engaging groove 11 can be replaced by a row of engaging grooves arranged at a spacing circumferentially of the pipe. The width, depth and axial spacing of the annular engaging grooves 11 can be determined suitably in accordance with the requirements involved.

Figure 13:
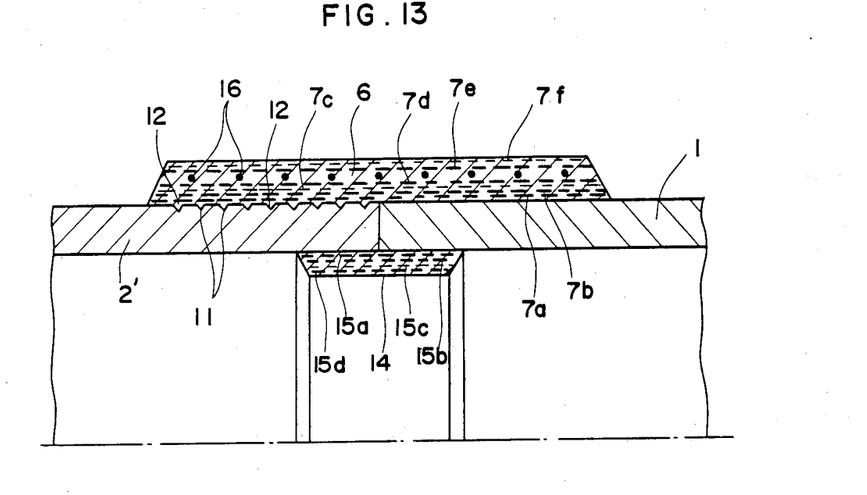
FIG. 13 is a fragmentary sectional view showing a pipe joint of fifth embodiment of the invention.

FIG. 13 shows a pipe joint wherein a resin pipe 1 and a stranger pipe 2' are arranged end-to-end and which includes an annular connecting resin body 6 laid over the outer peripheries of the opposed pipe ends. The outer periphery of the end of the stranger pipe 2' is formed with annular engaging grooves 11 arranged at a suitable spacing axially thereof. The resin body 6 has engaging projections 12 projecting from its inner periphery and fittingly engaged in the grooves 11. In the process for forming the resin body 6 by lamination, mats 7a, 7b in two layers, fabric 7c, mat 7d, piano wire 16, mat 7e and fabric 7f are embedded in the resin successively in the order mentioned. An annular resin seal 14 extends over the inner peripheries of the opposed ends of the two pipes 1, 2'. The resin seal 14 has embedded therein mats 15a, 15b in two layers, fabric 15c and mat 15d as arranged from outside to inside in the order mentioned.

With the pipe joint of the present embodiment, the outer periphery of the end of the resin pipe 1 is not formed with any engaging groove serving as bond reinforcing means because the resin body 6 and the resin pipe 1 are made of the same kind of material, such that sufficient bond strength can be obtained between the resin body 6 and the resin pipe 1 when the resin body 6 is pressed against the outer periphery of the pipe end which is sanded, by tightening up the piano wire 16. On the other hand, the outer periphery of the end of the stranger pipe 2', which is different in material from the resin body 6 and is therefore not amenable to adhesion thereto, is formed with the engaging grooves 11, which coact with the piano wire 16 to give the desired bond strength. The reinforcing fiber sheets 7a to 7f and 15a to 15d, which are arranged in the resin body 6 and the resin seal 14, respectively, as illustrated, increase the mechanical strength of these resin bodies 6, 14 to the greatest possible extent to reinforce the pipe joint.

Figure 14:
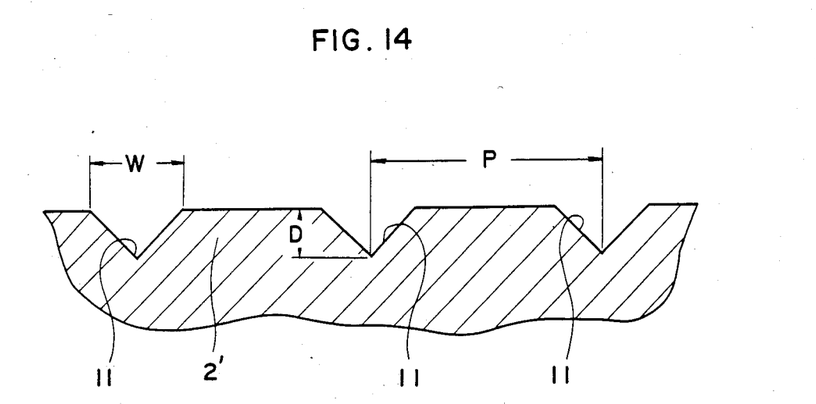
FIG. 14 is an enlarged sectional view showing engaging grooves serving as bond reinforcing means and used for the same pipe joint.

The width W, depth D and pitch P (FIG. 14) of the engaging grooves 11 of the stranger pipe 2' are, for example, 0.5 to 3 mm, 0.5 to 2 mm and 1 to 20 mm, respectively. The piano wire 16 is suitably 0.5 to 2 mm in diameter.

Figure 15:
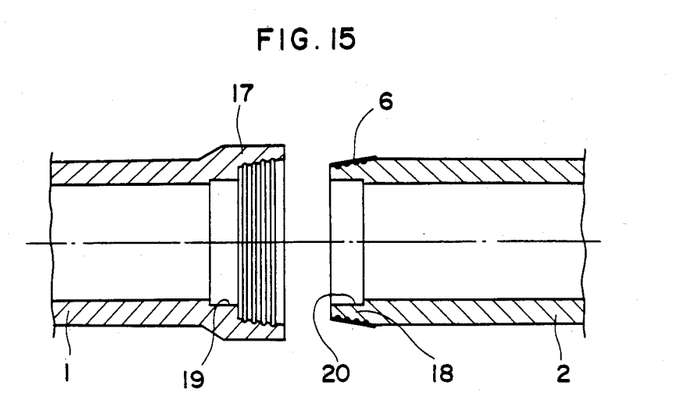
FIG. 15 is a view in longitudinal section showing a pipe joint of sixth embodiment of the invention.
Figure 16:
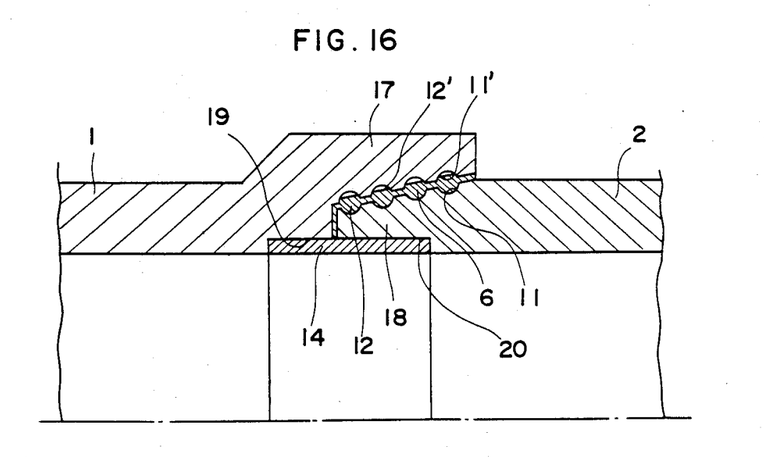
FIG. 16 is a fragmentary enlarged view in section showing the same pipe joint.

FIGS. 15 and 16 show a pipe joint in which a resin pipe 1 having a socket 17 at one end and a resin pipe 2 having a spigot 18 at one end are interconnected by an annular connecting resin body 6 interposed between the inner periphery of the socket 17 and the outer periphery of the spigot 18. These peripheries are formed with annular engaging grooves 11', 11 approximately semicircular in cross section and opposed to each other when the two pipes are assembled. An annular stepped portion 19 is formed at the inner peripheral portion of the socket 17 which portion is continuous with the portion thereof in contact with the resin body 6. The inner periphery of the spigot 18 is formed with an annular stepped portion 20. The two stepped portions 19 and 20 form an annular recess rectangular in cross section when the two pipes are assembled.

For assembly, a resin is applied to the outer periphery of the spigot 18 for forming the connecting resin body 6 (FIG. 15). At this time, the resin flows into the engaging grooves 11 in the outer periphery of the spigot 18 to form engaging projections 12. Next, the spigot 18 is inserted into the socket 17, whereupon the resin flows into the engaging grooves 11' in the inner periphery of the socket 17, forming engaging projections 12' and driving into the grooves 11' the air remaining owing to uneven application of the resin. Finally resin is poured into the annular recess provided by the two stepped portions 19, 20 to form a resin seal 14.

Even when a tensile force is exerted on the two pipes 1, 2 connected together by the pipe joint thus constructed, the connecting resin body 6 having the projections 12, 12' engaged in the grooves 11, 11' of the spigot 18 and the socket 17, respectively, fully withstands the tensile force. The air resulting from uneven application of the resin collects only in the grooves 11' of the socket 17 in which the projections 12' engage to give sufficient bond strength, so that the air will not impair the overall strength of the bond between the socket 17 and the connecting resin body 6. The resin seal 14, completely fitting in the annular recess provided by the stepped portions 19, 20, will not interfere with the flow of internal fluid.

Figure 17:
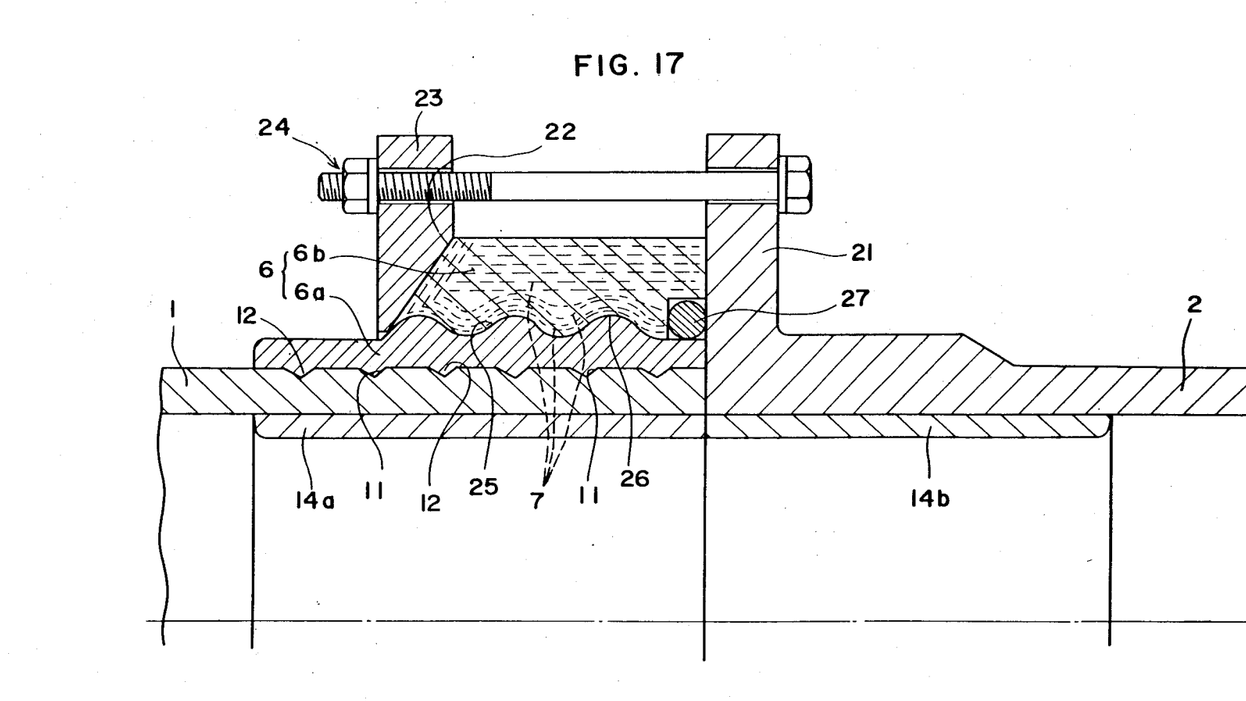
FIG. 17 is a fragmentary sectional view showing a pipe joint of seventh embodiment of the invention.

FIG. 17 shows a pipe joint wherein a resin pipe 1 having an annular connecting resin body (van stone flange) 6 at one end thereof is connected to a resin pipe 2 formed at one end thereof with a flange 21 integral therewith, by a ring 23 in engagement with a stepped portion 22 of the resin body 6 and by fastening means 24. The outer periphery of the end of the resin pipe 1 is formed with annular engaging grooves 11 arranged at a suitable spacing axially thereof. The connecting resin body 6 comprises an inner portion 6a formed on its inner periphery with engaging projections 12 fittingly engaged in the grooves 11 of the resin pipe 1 and having an undulation 25 on its outer periphery, and an outer portion 6b providing the stepped portion 22 and formed on its inner periphery with an undulation 26 complementary with the undulation of the inner portion 6a. The outer portion 6b of the resin body 6 includes reinforcing fiber sheets 7, some of which are so embedded as to extend along the undulation 26 and the stepped portion 22 of the outer portion 6b. A seal 27 is provided between the resin body 6 and the flange 21 of the resin pipe 2. The opposed end inner peripheries of the two resin pipes 1, 2 are provided with resin reinforcement 14a, 14b for giving improved bending strength to these ends.

With the pipe joint thus constructed, the axial displacement of the resin pipe 1 relative to the connecting resin body 6 is prevented by the engagement of the projections 12 of the resin body 6 in the grooves 11 in the pipe 1. The axial displacement of the outer portion 6b of the resin body 6 relative to the inner portion 6a thereof is prevented by the engagement between the undulations 25 and 26. The reinforcing fiber sheets 7 act against the force to be exerted on the outer portion 6b when the ring 23 is fastened to the flange 21 by the means 24.

Although a resin pipe is used as at least one of the two pipes in any of the foregoing embodiments, both pipes may be stranger pipes. The piano wire serving as bond reinforcing means, although used only in combination with other bond reinforcing means, is usable singly. At any rate, the present invention is not limited to the illustrated embodiments; the scope of the invention should be understood only with reference to the appended claims.

What is claimed is:

1. A pipe joint for connecting the opposed ends of two pipes to each other, said pipe joint comprising a connecting resin body extending over the outer peripheries of the opposed pipe ends and formed by the application of resin thereto, and a releasable tape wound on the outer periphery of said resin body while said resin is uncured, said tape having overlapping side edges with a clearance therebetween, said clearance permitting the outward flow of excess resin to smooth the outer periphery of said resin body.

2. A pipe joint as defined in claim 1 wherein the outer peripheries of the opposed pipe ends are tapered toward each other to define an annular recess approximately V-shaped in section, the connecting resin body being fitted in the annular recess.

3. A pipe joint as defined in claim 2 further comprising engaging grooves formed in the tapered outer peripheries of the opposed ends of the pipes and arranged at a spacing axially thereof, and engaging projections projecting from the inner periphery of the connecting resin body and fitting in the engaging grooves.

4. A pipe joint as defined in claim 2 wherein the outer periphery of the connecting resin body has been made flush with the normal-diameter outer periphery of each pipe by said releasable tape.

5. A pipe joint as defined in claim 2 wherein a resin seal is provided in contact with the inner peripheries of the opposed ends of the two pipes.

6. A pipe joint as defined in claim 2 wherein the two pipes are made of different materials, and including bond reinforcing means comprising a piano wire embedded in the connecting resin body and tightened up for pressing the connecting resin body against the outer peripheries of the two pipes.

7. A pipe joint as defined in claim 3 wherein the two pipes are made of different materials, and including bond reinforcing means comrising a piano wire embedded in the connecting resin body and pre-stressed to press the connecting resin body against the outer peripheries of the two pipes.

8. A pipe joint as defined in claim 1 wherein the connecting resin body has embedded therein one or more sheets of reinforcing fibers.

9. A pipe joint as defined in claim 1 further comprising engaging grooves formed in the outer periphery of the end of at least one of said pipes and arranged at a spacing axially thereof, and engaging projections projecting from the inner periphery of the connecting resin body and fitting in the engaging grooves.

10. A pipe joint as defined in claim 1 wherein one of said pipes is made of resin, and the other of said pipes is made of a material different from the resin, the connecting resin body extending over the outer peripheries of the opposed ends of the two pipes and having at least one or more reinforcing fiber sheet in its interior, and bond reinforcing means comprising a piano wire embedded in the connecting resin body and tightened up to press the connecting resin body against the outer peripheries of the two pipes, engaging grooves formed in the outer periphery of the end of at least said other pipe and arranged at a spacing axially thereof, and engaging projections projecting from the inner periphery of the connecting resin body and fitting in the engaging grooves.

11. A pipe joint as defined in claim 10 further comprising an annular resin seal extending over the inner peripheries of said opposed pipe ends in contact therewith, said annular resin seal having at least one or more reinforcing fiber sheet in its interior.

12. A method of forming a pipe joint comprising a connecting resin body for connecting the opposed ends of two pipes to each other, said connecting resin body extending over the outer peripheries of the opposed pipe ends, the method comprising applying resin over the outer peripheries of the opposed pipe ends to form said connecting resin body, and while said resin body is still uncured winding a releasable tape around said resin body in a manner such that the side edges of said tape overlap each other with a clearance formed therebetween, whereby the outer periphery of said resin body is smoothed by allowing an excess of resin to flow out through said clearance.

13. A method of forming a pipe joint comprising a connecting resin body for connecting the opposed ends of two pipes to each other, said connection resin body extending over the outer peripheries of the opposed pipe ends, the method comprising applying resin over the outer peripheries of the opposed pipe ends to form said connecting resin body, while said resin body is still uncured winding a releasable tape around said resin body in a manner such that the side edges of said tape overlap each other with a clearance formed therebetween to smooth the outer periphery of said resin body by allowing an excess of resin to flow out through said clearance, and removing said releasable tape after said resin body has been cured.

* * * * *